United States Patent
Zhao et al.

(10) Patent No.: US 9,654,413 B2
(45) Date of Patent: May 16, 2017

(54) METHOD, DEVICE, AND SYSTEM FOR IMPLEMENTING NETWORK ACCESS, AND NETWORK SYSTEM

(71) Applicant: BEIJING QIHOO TECHNOLOGY COMPANY LIMITED, Xicheng, Beijing (CN)

(72) Inventors: Gang Zhao, Beijing (CN); Bo Lu, Beijing (CN); Yuanjiang Zhou, Beijing (CN)

(73) Assignee: Beijing Qihoo Technology Company Limited, Beijing (CN)

( * ) Notice: Subject to any disclaimer, the term of this patent is extended or adjusted under 35 U.S.C. 154(b) by 50 days.

(21) Appl. No.: 14/388,299

(22) PCT Filed: Mar. 19, 2013

(86) PCT No.: PCT/CN2013/072850
§ 371 (c)(1),
(2) Date: Sep. 26, 2014

(87) PCT Pub. No.: WO2013/143405
PCT Pub. Date: Oct. 3, 2013

(65) Prior Publication Data
US 2015/0058986 A1   Feb. 26, 2015

(30) Foreign Application Priority Data
Mar. 31, 2012   (CN) .......................... 2012 1 0093768

(51) Int. Cl.
*G06F 11/00*   (2006.01)
*H04L 12/911*   (2013.01)
(Continued)

(52) U.S. Cl.
CPC .......... *H04L 47/70* (2013.01); *H04L 63/1408* (2013.01); *H04L 63/1441* (2013.01); *H04L 67/02* (2013.01)

(58) Field of Classification Search
CPC ............. H04L 63/1483; H04L 63/1408; H04L 63/0227; H04L 63/1441; H04L 67/2814; G06F 2221/2119; G06F 21/00
See application file for complete search history.

(56) References Cited

U.S. PATENT DOCUMENTS 7,117,361 B1 * 10/2006 Hild ........................ H04L 29/06
713/161
7,865,953 B1 * 1/2011 Hsieh ................ G06F 17/30887
726/22

(Continued)

FOREIGN PATENT DOCUMENTS

CN            102724190 A  * 10/2012  ............. G06F 21/00
WO   WO 2007038283 A2  *  4/2007  ....... G06F 17/30861

OTHER PUBLICATIONS

International Search Report regarding Chinese International Application No. PCT/CN2013/072850 issued Jun. 27, 2013, 4 pages.

(Continued)

*Primary Examiner* — Farid Homayounmehr
*Assistant Examiner* — Lizbeth Torrees-Diaz
(74) *Attorney, Agent, or Firm* — James M. Stipek; John R. Bednarz; Polsinelli PC

(57) ABSTRACT

Disclosed are a method, device, and system for implementing network access, and a network system. The method comprises: in the case that a terminal requests to access a webpage, a server determining content of the webpage that the terminal requests to access; and the server searching for a webpage, used as a reference webpage, with relevant content matching the content of the webpage, and providing information of the found reference webpage for the terminal.

(Continued)

The present invention can enable a user terminal to obtain multiple associated access results by performing webpage access once. Even though the terminal cannot for some reason access a webpage originally expected to be accessed, or content of a webpage originally expected to be accessed cannot meet a user requirement, has a bad display effect, or even cannot be displayed, other webpages with associated or same content can be provided for the terminal, so that a webpage that comprises sufficient information, has a better display effect, and is securer is provided for the terminal, thereby avoiding an additional access operation of the terminal and improving the browsing efficiency and experience of a user.

18 Claims, 3 Drawing Sheets

(51) Int. Cl.
  *H04L 29/08* (2006.01)
  *H04L 29/06* (2006.01)

(56) References Cited

U.S. PATENT DOCUMENTS

| | | | |
|---|---|---|---|
| 8,474,048 B2* | 6/2013 | Masood | G06F 21/51 709/203 |
| 2003/0225855 A1* | 12/2003 | Hamilton, II | G06F 17/30899 709/217 |
| 2008/0235187 A1* | 9/2008 | Gade | G06F 17/3064 |
| 2009/0070873 A1* | 3/2009 | McAfee | G06F 21/56 726/23 |
| 2011/0191849 A1* | 8/2011 | Jayaraman | H04L 63/1416 726/23 |
| 2012/0023593 A1* | 1/2012 | Puder | H04L 63/101 726/28 |
| 2012/0047577 A1* | 2/2012 | Costinsky | H04L 67/02 726/22 |
| 2013/0066959 A1* | 3/2013 | Brundage | H04L 67/02 709/203 |
| 2014/0344224 A1* | 11/2014 | LeBert | G06F 8/70 707/684 |
| 2015/0067853 A1* | 3/2015 | Amrutkar | H04L 63/14 726/23 |

OTHER PUBLICATIONS

English translation of abstract only of Chinese application CN101341717A, Title: Method for Evaluating and Accessing a Network Address, Publication date: Jan. 7, 2009, Country: CN, Inventors: Vanden Berghe Chris P; Pietraszk Tadeusz J., one page.
English translation of abstract only of Chinese application CN101641697A, Title: Related Search Queries for a Webpage and Their Applications, Publication date: Feb. 3, 2010, Country: CN, Inventors: Chaitanya Gade Krishna, et al., one page.
English translation of abstract only of Chinese application CN102200980A, Title: Method and System for Providing Network Resources, Publication date: Sep. 28, 2011, Country: CN, Inventors: Youxin Jiang, one page.

* cited by examiner

METHOD, DEVICE, AND SYSTEM FOR IMPLEMENTING NETWORK ACCESS, AND NETWORK SYSTEM

FIELD OF THE INVENTION

The present invention relates to the field of communications, and specifically to a method, device, and system for implementing network access, and a network system.

BACKGROUND OF THE INVENTION

Usually, a user accesses a webpage corresponding to a hyperlink or a web address by selecting the hyperlink or inputting the web address. Therefore, upon performing access, the user usually can only obtain a sole webpage definitely to be accessed according to the inputted content and cannot obtain other results. However, in the case that the webpage the user is accessing is prohibited for some reason or expires so that the terminal cannot access normally, the terminal cannot see any webpage information after performing the webpage access operation of this time, that is to say, it will not obtain any access result. Hence, the user's operation of the terminal to access the webpage this time is invalid, and the handling manner of not returning any result in response to the user's operation substantially reduces the user's experience. In addition, since the result information obtained from the user's one-time access to the webpage is very limited, the information obtained from the current access is probably insufficient and cannot meet the user's needs. If the user expects to obtain more information, he has to continue to access other webpages so that extra operations are needed; besides, factors such as webpage layout and webpage code probably cause problems such as inadaptation and undesirable effect between the current webpage layout and the terminal browser, low definition of video in a video webpage and even failure to normally display many content on the terminal, and therefore the user also has to perform extra webpage access operations to obtain results that meet the requirements.

Currently, an effective solution is not yet proposed in view of the problems in the prior art such as undesirable user experience and low access efficiency upon accessing the webpage.

SUMMARY OF THE INVENTION

In view of the above problems, the present invention is proposed to provide a method, device, and system for implementing network access, which can overcome the above problems or at least partially solve or ease the above problems.

According to an aspect of the present invention, there is provided a method for implementing network access, comprising:

determining, by a server, content of a webpage that a terminal requests to access in the case that the terminal requests to access the webpage;

searching for, by the server, a webpage with relevant content matching the content of the webpage that the terminal requests to access, as a reference webpage and providing information of the found reference webpage to the terminal.

According to another aspect of the present invention, there is provided a device for implementing network access, comprising:

a determining module configured to determine content of the webpage that the terminal requests to access in the case that the terminal requests to access the webpage;

a searching module configured to search for a webpage with relevant content matching the content of the webpage that the terminal requests to access, as a reference webpage;

a providing module configured to provide information of the found reference webpage to the terminal.

According to a further aspect of the present invention, there is provided a system for implementing network access, comprising: a terminal, a server, a buffer database and a webpage information database.

Wherein the server comprises: a determining module configured to determine content of the webpage that a terminal requests to access in the case that the terminal requests to access a webpage; a searching module configured to search for a webpage with relevant content matching the content of the webpage that the terminal requests to access, as a reference webpage; a providing module configured to provide information of the found reference webpage to the terminal.

The buffer database is configured to buffer information of the webpage;

The webpage information database is configured to store information of the webpage;

wherein the searching module preferentially searches for, in the webpage information buffered by the buffer database, a reference webpage which matches the content of the webpage that the terminal request to access.

According to a further aspect of the present invention, there is provided a network system, comprising one or more terminals and one or more servers, wherein each server comprises the above device for implementing network access.

According to a further aspect of the present invention, there is provided a computer program, comprising a computer readable code; when the computer readable code is run on a server, the server executes the method for implementing network access according to any one of claims 1-10.

According to a further aspect of the present invention, there is provided a computer readable medium which stores the computer program according to claim 24.

Advantageous effects of the present invention are as follows:

By determining the content of the webpage that the user desires to access, searching for, on this basis, other webpages matching this type and notifying the terminal of the found other webpages as reference webpages, the present invention can enable the user terminal to obtain a plurality of associated access results by executing webpage access one time. Even though the terminal, for some reason, cannot access the webpage that it originally desires to access, similar results can be obtained, thereby avoiding the problem that the terminal cannot obtain any result after performing one access. Furthermore, the terminal needn't perform operation many times as accessing multiple webpages. Particularly when the to-be-accessed webpage is detected as containing malicious codes, the server can notify the terminal of similar secure results and can notify the terminal of result of the same type by only performing operation one time.

When the terminal requests to access a webpage, the present invention can provide the terminal with information of other webpages having relevant content so that the terminal's access result is not sole. As a result, in the case that the user's access operation cannot obtain any results or obtained results cannot meet the requirements because the webpage that the terminal originally desires to access is prohibited, expires, or has less content or undesirable display effect, more content-related webpages are provided to the terminal so that the terminal can obtain many desired webpages through one-time access and select therefrom, which improves the user's experience and enhances the user's browsing efficiency.

The above description only generalizes technical solutions of the present invention. The present invention may be implemented according to the content of the description in order to make technical means of the present invention more apparent. Specific embodiments of the present invention are exemplified to make the above and other objects, features and advantages of the present invention more apparent.

BRIEF DESCRIPTION OF THE DRAWINGS

Various other advantages and merits will become apparent to those having ordinary skill in the art by reading through the following detailed description of preferred embodiments. Figures are only intended to illustrate preferred embodiments and not construed as limiting the present invention. In all figures, the same reference number denotes the same part. In the figures.

DETAILED DESCRIPTION OF THE INVENTION

The present invention will be further described below with reference to figures and specific embodiments.

According to an embodiment of the present invention, there is provided a method for implementing network access.

Figure 1:
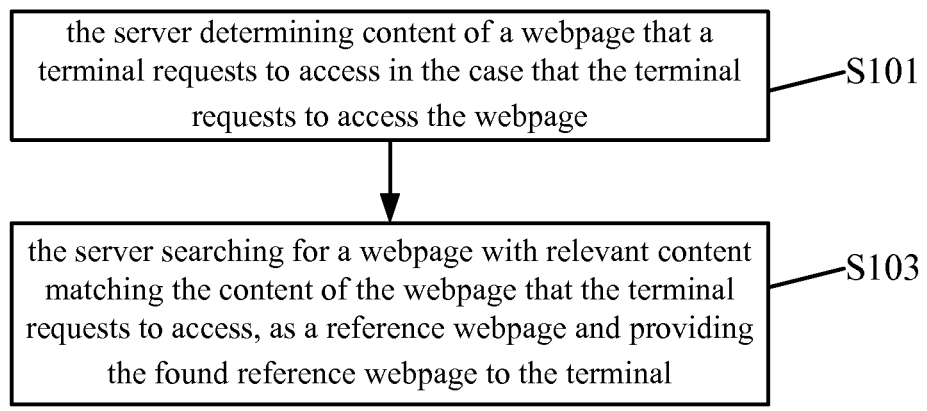
FIG. 1 illustrates a flow chart of a method for implementing network access according to an embodiment of the present invention.

As shown in FIG. 1, the method for implementing network access according to the embodiment of the present invention comprises:

Step S101: in the case that a terminal requests to access a webpage, a server (which may be transcoding server) determining content of the webpage that the terminal requests to access; and Step S103: the server searching for a webpage, with relevant content matching the content of the webpage (matching here may refer to identical, similar or associated), considering as a reference webpage, and providing the found reference webpage for the terminal.

Wherein, when the found reference webpage is provided to the terminal, it may be directly provided to the terminal, and/or matching information of the found reference webpage and the webpage to be accessed is provided to the terminal. Optionally, webpage content includes one of news, pictures, novel, video, audio, games and shopping information in the webpage or combinations of more of them, or content relevant to them. There may be many kinds of specific content, which will not be detailed here one by one.

In addition, it is uncertain for the server to search for a matching type of reference webpage to all accesses of all terminals. For example, in the case that the terminal requests to access a webpage, the server may first judge whether to provide the webpage with the relevant content to the terminal. Only when the judgment result is yes does the server determine the content of the webpage that the terminal requests to access, that is to say, the above step S101 and step S103 will be performed only when the judgment result of the server in this step is yes.

Whether it is necessary to search for reference webpages with matching content for the terminal may be judged by referring to many kinds of conditions. For example, in the case that the terminal sets webpages with relevant content to be provided, or in the case that default setting of the system requires provision of webpages with relevant content to the terminal, or in the case that the webpage that the terminal requests to access cannot be displayed (e.g., because the webpage expires or screened), or in the case that the webpage that the terminal requests to access is a malicious webpage, or in the case of combinations of the above cases, the server searches for the reference webpages matching with main content of the webpage accessed this time, wherein the main content may refer to main content of the webpage, and the server provides the terminal with information of reference webpages matching the content of the webpage that the terminal requests to access/or selects one of the reference webpages and provides information of this reference webpage to the terminal. As such, information of the webpage with the relevant content can be returned with respect to the terminal access that needs such information. Regarding a terminal that definitely requires no provision of reference webpages, searching and provision of reference webpages will not be performed in the case that it can successfully access the webpage, thereby omitting unnecessary network search and handling for such users.

Additionally, in the case that the webpage that the terminal requests to access is a malicious webpage, the server searches in a malicious web address library. If the search result is that the webpage that the terminal request to access exists in the malicious web address library, the server determines that the webpage that the terminal requests to access is a malicious webpage, prohibits the server from accessing the malicious webpage, and provides the found secure reference webpage to the terminal, thereby avoiding the problem that no result is returned in response to the terminal's operation at this time and improving the user's experience.

Specifically, in the case that the terminal requests to access the webpage, the server searches in a malicious web address library (wherein the malicious web address library may be API that automatically checks malicious scripts, checking that use belongs to malicious web address listing whenever the user accesses; the search efficiency may be improved by using Hash). If the search result is that the webpage that the terminal request to access exists in the malicious web address library, the server determines that the webpage that the terminal requests to access is a malicious webpage. For example, if the web address accessed by the user (or other reference information which may be used to compare, like characteristic codes, etc.) is in the malicious wed address listing, HTML content will be returned to prompt the user and inform the user that the website might have security issue and let the user away from threat. Specifically, when the URL that the mobile terminal requests to access is a malicious webpage, the server not only returns information to the effect that "original web address is malicious webpage and access is not granted", but also meanwhile returns secure webpages with the same main content stored in the database to the mobile terminal for display. As such, the user not only obtains the prompt that "access is not granted", but also is provided with secure webpages similar to the user-desired webpage one time, so that the user needn't perform the searching step again. Besides, the malicious web address library may not only store information of malicious webpages (e.g., link address or characteristic code), but also store relevant information of webpages that are difficult to determine. Hence, content of the malicious web address library is configured to avoid the user terminal's access to the malicious webpage, and meanwhile avoid the terminal's access to many webpages in which whether malicious information is included is hard to determine, and further improve security of the terminal's access to the webpage.

Additionally, if the webpage that the user originally desires to access expires, content therein is insufficient, display effect is undesirable and even the webpage cannot be displayed, webpage which includes sufficient information, has a better display effect and which layout is correctly arranged can also be provided through the above handling method. For example, assume that user A clicks a never-accessed shopping website among the search results and the website is a phishing website created by a hacker, the server will immediately return a prompt to the effect that the webpage is a phishing website and advise the user to use a shopping website having a better layout effect so that the user may continue to conduct secure shopping. For example, video definition is not high in the video webpage that the user originally desires to access, webpages with identical or similar video content will be returned through the above handling, and these webpages will include video with higher definition and thereby improve the user's browsing efficiency and use experience.

Furthermore, in the case that the webpage that the terminal requests to access is a malicious webpage, the implementing method further comprises the server prohibiting the terminal from accessing the malicious webpage.

Furthermore, when the server searches for reference webpages which matches the main content of the webpage that the terminal request to access, the server may search whether webpages which match the main content of the webpage that the terminal request to access exist in a buffer database, and, in the event of existence, consider the found webpage as the reference webpage and provide information of the reference webpage to the terminal; in the event of no existence, the server searches for, in a webpage information database, webpage which matches the main content of the webpage that the terminal request to access, considers the found webpage as the reference webpage, and provides information of the reference webpage to the terminal and meanwhile stores it in the buffer database.

Furthermore, before providing the reference webpage found from the webpage information database to the terminal, the server may judge whether the address of the reference webpage exists in the malicious web address library, and provide information of reference webpages not exiting in the malicious web address library to the terminal.

The malicious web address library may be integrated with the buffer database, that is to say, the malicious web address library may store malicious link addresses and meanwhile store webpages (webpage addresses or content of webpages) that are verified to be secure. As such, when the server finds, from the webpage information database, reference webpages which match the main content of the webpage that the terminal request to access, the server first provides the found webpages to the malicious web address library, the malicious web address library determines whether the webpages provided by the server are malicious webpages and provides webpages that are filtered and determined as secure webpages to the server to ensure that the server subsequently provides secure webpages to the terminal. Furthermore, after filtration the malicious web address library locally buffers secure webpages which are determined secure after filtration (stores link addresses, content, title or combinations thereof) so that the server may look up from the buffered content, which reduces time spent by the server in looking up the webpages.

Before providing the found reference webpages to the terminal, the server judges the type of the terminal and judges whether to perform transcoding for the reference webpage according to the type of the terminal. If the judgment result shows that the transcoding is needed, transcoding is performed for the reference webpage by a transcoding module (the transcoding module may be set in the server, that is to say, the server performs the transcoding and the server may be a transcoding server at this time), and the reference webpage after the transcoding is provided to the terminal.

Besides, as mobile internet develops constantly, more and more users decide to use mobile devices, not only computers, to access the Internet. However, when direct access to a PC webpage is performed on a mobile device other than the computer, since functional parameters of the mobile device such as display resolution is distinct from those of the computer, the effect of the mobile device's access to the webpage degrades greatly. The present invention, by performing transcoding for the webpage according to the type of the terminal, can ensure that various mobile terminals can display the webpage normally.

In addition, when information of the found reference webpage is provided to the terminal, the found reference webpage may be directly provided to the terminal, and/or the matching information of the found reference webpage and the webpage to be accessed is provided to the terminal, and/or a link address of the found reference webpage is provided to the terminal, and/or a title of the found webpage is provided to the terminal.

In practical application, the layout of content of the webpage may be rearranged, for example, it is feasible to judge the number and positions of controls in the webpage, judge whether the controls overlap, and then score the webpage according to factors such as richness degree of the content and a size of white space.

Specifically, judgment of an overlap area of controls is described through the following statements. C# sample is as follows:

```
/// <summary>
/// obtain overlap area
/// </summary>
/// <param name="rect"></param>
/// <returns></returns>
public Rectangle GetOverlapRectangle(Rectangle rect)
{
    if (rect == null || !this.IsIntersected(rect))
```

```
{
    return null;
}
int top = this.Top > rect.Top ? this.Top : rect.Top;
int bottom = this.Bottom > rect.Bottom ? rect.Bottom: this.Bottom;
int left = this.Left > rect.Left ? this.Left : rect.Left;
int right = this.Right > rect.Right ? rect.Right : this.Right;
return new Rectangle(left, top, right - left + 1, bottom - top + 1);
}
```

A ratio is finally generated through the above procedure, for example, a webpage overlap rate is 10%; different mobile terminal versions (e.g., different mobile phone versions) are scanned and compared and finally a webpage with a better effect is returned.

Webpages of some versions are designed with a larger white space, which may affect the effect. A method of detecting the white space is mainly binary searching method specifically as follows: first assume that the whole webpage be white, search begins with webpage 0,0 coordinate; if a control is found in this white space, this white space does not exist, and then the white space area is divided by two; whether the white space exits is detected by the same method until the largest white space area is finally found.

Besides, detection of the white space may simultaneously support manual intervention to remedy demerits of judgment. As compared with an ordinary UA skip, the solution of the present invention requires lower maintenance cost and can easily find layout problem.

According to an embodiment of the present invention, there is further provided a device for implementing network access.

Figure 2:
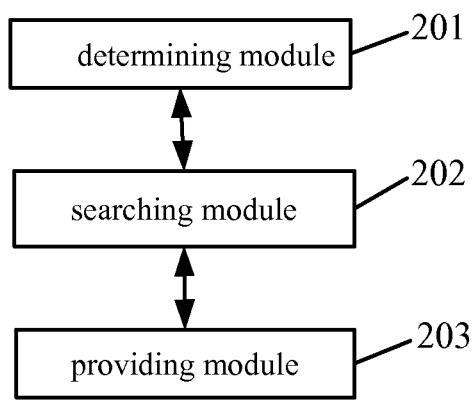
FIG. 2 illustrates a block diagram of a device for implementing network access according to an embodiment of the present invention.

As shown in FIG. 2, the device for implementing network access according to the embodiment of the present invention comprises:

a determining module 201 configured to determine content of a webpage that a terminal requests to access in the case that the terminal requests to access the webpage;

a searching module 202 configured to search for a webpage with relevant content matching the content of the webpage that the terminal requests to access, as a reference webpage;

a providing module 203 configured to provide information of the found reference webpage to the terminal.

The implementing device further comprises:

A judging module (not shown) configured to judge whether to provide the webpage with relevant content to the terminal in the case that the terminal requests to access the webpage, and to inform the determining module 201 to determine the content of the webpage that the terminal requests to access when the judgment result is yes.

Wherein the webpage with relevant content is provided to the terminal when the judgment result of the judging module satisfies at least one of the following conditions:

the terminal sets the webpage with relevant content to be provided, default setting of the system requires the provision of webpage with relevant content to the terminal, the webpage that the terminal requests to access is a malicious webpage, and the webpage that the terminal requests to access cannot be displayed.

The providing module 203 provides the terminal with information of the reference webpage matching the content of the webpage that the terminal requests to access/or selects one of the reference webpages and provides information of this reference webpage to the terminal.

Besides, the device may further comprise a security module. Specifically, in the case that the terminal requests to access the webpage, the security module queries in the malicious web address library. If the query result shows that the address of the webpage that the terminal requests to access exists in the malicious web address library, the security module determines that the webpage that the terminal requests to access is a malicious webpage, and the providing module 203 provides the terminal with information of the found reference webpage matching the content of the webpage that the terminal requests to access, and a prompt that the webpage that the terminal requests to access is a malicious webpage.

Besides, the implementing device according to the embodiment of the present invention further comprises:

An access control module (not shown) configured to prohibit the terminal from accessing the malicious webpage in the case that the webpage that terminal requests to access is a malicious webpage.

Furthermore, the searching module 202 may be configured to search whether webpages which match the main content of the webpage that the terminal request to access exist in the buffer database, and, in the event of existence, the providing module 203 considers the found webpage as the reference webpage and provide information of the reference webpage to the terminal; in the event of no existence, the searching module 202 searches for, in a webpage information database, webpages which match the main content of the webpage that the terminal request to access, considers the found webpage as the reference webpage, and provides information of the reference webpage to the terminal and meanwhile stores it in the buffer database.

Additionally, the above security module (not shown) may be further configured to judge whether the address of the reference webpage exists in the malicious web address library before the server provides information of the reference webpage found from the webpage information database to the terminal.

Furthermore, the providing module 203 is configured to provide the reference webpage that does not exist in the malicious web address library to the terminal.

The implementing device further comprises:

A terminal type determining unit (not shown) configured to, before the providing module of the server provides information of the found reference webpage to the terminal, determine the type of the terminal and judge whether to perform transcoding for the reference webpage according to the type of the terminal.

A transcoding module (not shown) configured to perform transcoding for the reference webpage if the judgment result of the terminal type determining unit shows that the transcoding is needed, and the providing module 203 providing the reference webpage after transcoding to the terminal.

Furthermore, the providing module 203 is configured to directly provide the found reference webpage to the terminal, and/or provide the matching information of the found reference webpage and the webpage to be accessed to the terminal, and/or provide a link address of the found reference webpage to the terminal, and/or send a title of the found webpage to the terminal. Optionally, webpage content includes one of news, pictures, novel, video, music and games in the webpage or combinations of more of them, or content relevant to them (at least one thereof or combinations thereof).

According to an embodiment of the present invention, there is further provided a system for implementing network access.

Figure 3:
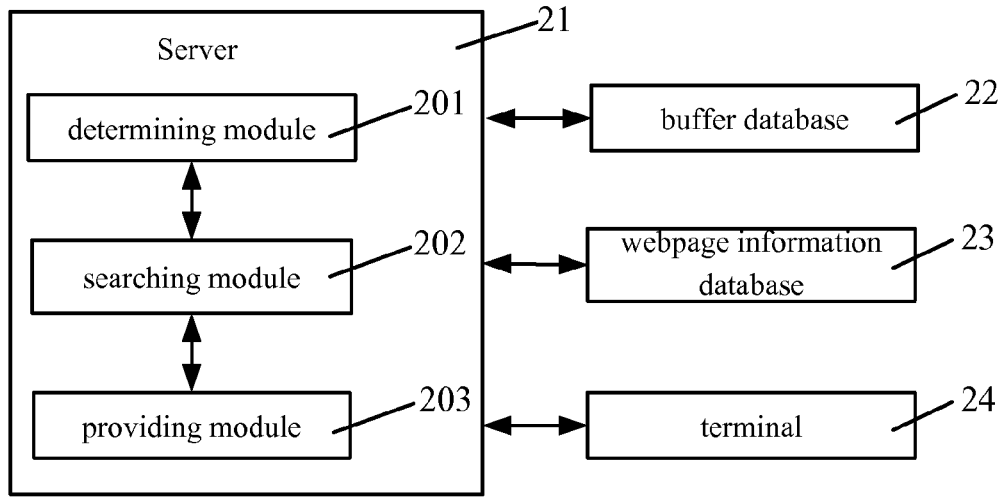
FIG. 3 illustrates a block diagram of a system for implementing network access according to an embodiment of the present invention.

As shown in FIG. 3, the system for implementing network access according to the embodiment of the present invention comprises: a server 21, a buffer database 22, a webpage information database 23 and a terminal 24.

Wherein the server comprises: a determining module 201 configured to determine content of a webpage that a terminal 24 requests to access in the case that the terminal 24 requests to access the webpage; a searching module 202 configured to search for a webpage with relevant content matching the content of the webpage that the terminal requests to access, as a reference webpage; a providing module 203 configured to provide information of the found reference webpage to the terminal 24.

Furthermore, the buffer database 22 is configured to buffer information of the webpage (information of the webpage may include address, content, title of the webpage or combinations thereof); the webpage information database 23 is configured to store information of the webpage (information of the webpage may include address, content, title of the webpage or combinations thereof);

Wherein the searching module 202 preferentially searches for, in the webpage information buffered by the buffer database 22, a reference webpage which matches the content of the webpage that the terminal request to access, and the searching module 202 search for the reference webpage with the matching content from the webpage information database 23 if the reference webpage with the matching content is not found from the buffer database 22.

The implementing system further comprises:

A malicious web address library (not shown) configured to store information relevant to one or more kinds of suspicious web address, suspicious code, malicious web address and malicious code. In fact, any information identifying unknown webpage and/or malicious webpage can be stored in the malicious web address library for reference in subsequent queries.

The server further comprises:

A security module configured to query in the malicious web address library. If the query result shows that the webpage that the terminal requests to access exists in the malicious web address library, the security module determines that the webpage that the terminal requests to access is a malicious webpage, and the providing module provides the terminal with information of the found reference webpage matching the content of the webpage that the terminal requests to access, and a prompt that the webpage that the terminal requests to access is a malicious webpage.

Figure 4:
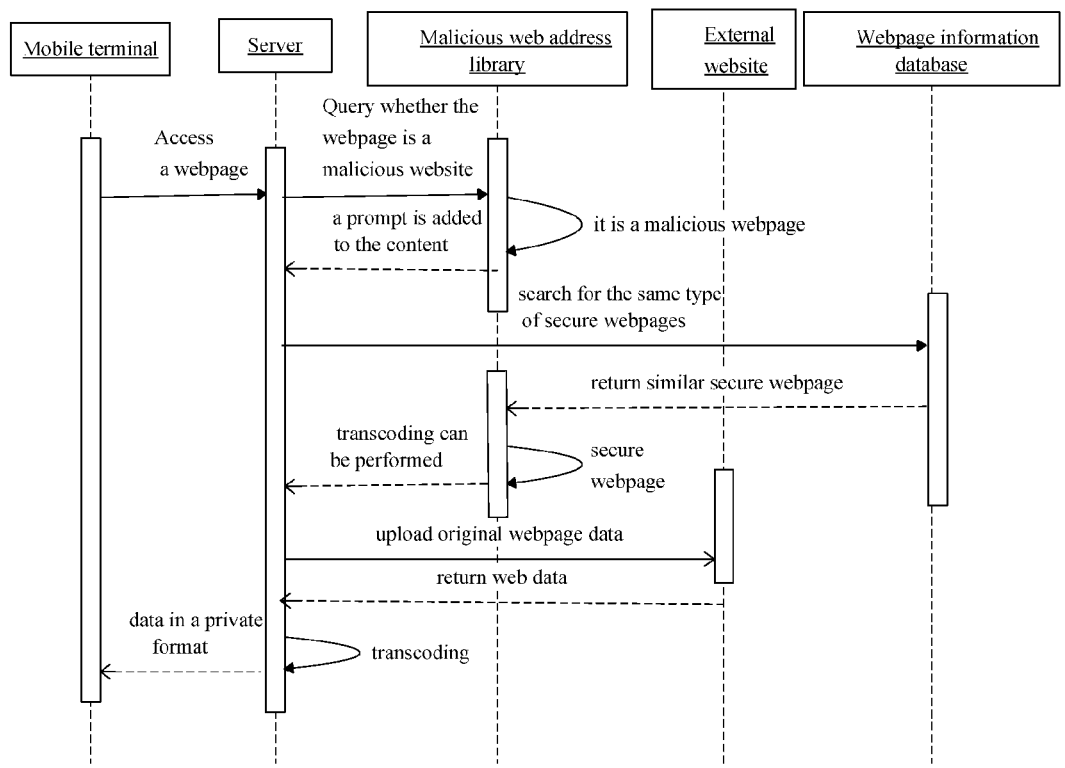
FIG. 4 illustrates a flow chart of a signaling of a specific implementing procedure of the method for implementing network access according to an embodiment of the present invention.

FIG. 4 illustrates a flow chart of a signaling of a specific implementing procedure of the method according to an embodiment of the present invention.

As shown in FIG. 4, in a system comprising a server and a terminal, providing the webpage with relevant content may specifically include the following steps:

When the server receives a request to access a webpage sent from a mobile terminal, the server queries in the malicious web address database in the system whether the requested webpage is a malicious webpage. If the webpage is a malicious webpage, information will be returned to the server from the malicious web address database, and a prompt to the effect that the webpage is a malicious webpage is added to the content. Then, the server directly searches for, via the webpage information database, secure webpages in the same type as the accessed webpage, and sends the found similar secure webpages in the same type as the accessed webpage to the malicious web address library of the system. The malicious web address library transcodes the secure webpages and sends them to the server. The server uploads data of the original webpage via an external website, and then the external website returns data of the original webpage after the uploading to the server, and finally, the webpage data are transcoded and sent to the mobile terminal in a private format.

To conclude, by virtue of the above technical solution of the present invention, the present invention may improve the transcoding server so that the transcoding server can search for a webpage in a matching type for the terminal and provide the webpage to the terminal such that the terminal's access results gets richer and the terminal's invalid operations can be avoided; besides, by virtue of the technical solution of the present invention, the transcoding server becomes a first-layer protection of the terminal user to ensure the terminal's access security, stop the terminal from accessing the malicious webpage before the transcoding in a true sense, and avoid entry of virus or malicious information into the terminal; besides, in the prior art, regarding a portal website providing different mobile terminals, effects of different terminal versions are different. Generally, website developers only take into account mainstream mobile terminals, so effects when other terminals access generally degrade greatly. The present invention may return the webpage with the optimal effect to the access terminal in different terminal versions, meanwhile reduce the testing cost, and meanwhile support manual intervention and integrate a security detecting function. When the webpage accessed by the user is a malicious webpage, the user is advised to access a webpage having similar content and better layout effect to thereby improve the use's browsing efficiency and experience.

Embodiments regarding parts in the present invention may be implemented in hardware, or implemented by software modules running on one or more processors, or implemented in their combinations. Those skilled in the art should understand that a microprocessor or digital signal processor (DSP) may be used in practice to implement some or all functions of some or all parts of the device or system according to embodiments of the present invention. The present invention may also be implemented as an apparatus or device program (e.g., computer program and computer program product) for executing part or all methods described here. Such programs implementing the present invention may be stored in a computer-readable medium, or may be in a form having one or more signals. Such signals can be obtained by downloading from the Internet, or provided on a carrier signal or provided in any other forms.

Figure 5:
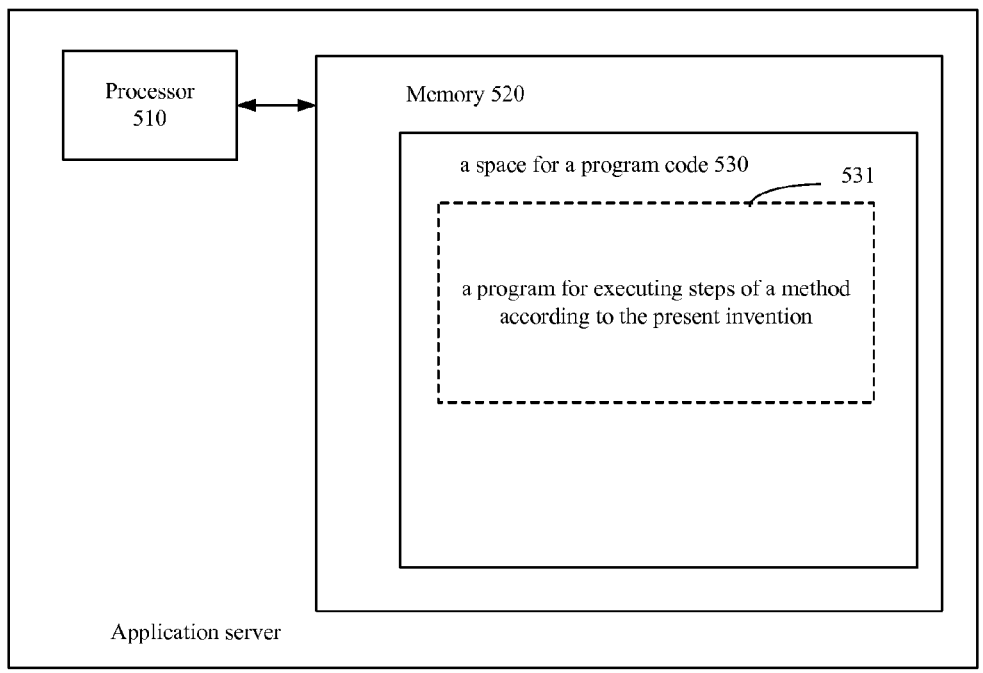
FIG. 5 illustrates a block diagram of a server for executing the method according to the present invention.
Figure 6:
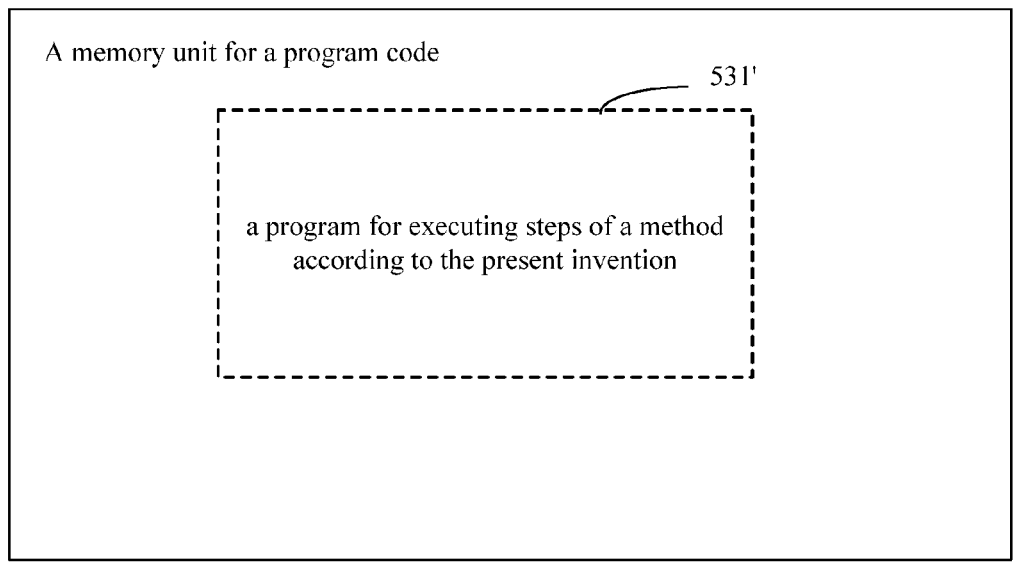
FIG. 6 illustrates a memory unit for maintaining or carrying a program code for implementing the method according to the present invention.

For example, FIG. 5 illustrates a server, for example, an application server, which can implement a method for implementing network access according to the present invention. The server conventionally comprises a processor 510 and a computer program product or computer-readable medium in the form of a memory 520. The memory 520 may be a flash memory, EEPROM (Electrically Erasable Programmable Read-Only Memory), EPROM, hard disk or ROM-like electronic memory. The memory 520 has a storage space 530 for a program code 531 for executing any step of the above method. For example, the storage space 530 for the program code may comprise program codes 531 respectively for implementing steps of the above method. These program codes may be read from one or more computer program products or written into the one or more computer program products. These computer program products comprise program code carriers such as hard disk, compact disk (CD), memory card or floppy disk. Such computer program products are usually portable or fixed memory units as shown in FIG. 6. The memory unit may have a storage section, a storage space or the like arranged in a similar way to the memory 520 in the server of FIG. 5. The program code may for example be compressed in a suitable form. Usually, the memory unit includes a computer-readable code 531', namely, a code readable by a processor for example similar to 510. When these codes are run by the server, the server is caused to execute steps of the method described above.

Reference herein to "one embodiment", "an embodiment", or to "one or more embodiments" means that a particular feature, structure, or characteristic described in connection with the embodiments is included in at least one embodiment of the invention. Further, it is noted that instances of the phrase "in one embodiment" herein are not necessarily all referring to the same embodiment.

The description as provided here describes a lot of specific details. However, it is appreciated that embodiments of the present invention may be implemented in the absence of these specific details. Some embodiments do not specify detail known methods, structures and technologies to make the description apparent.

It should be noted that the above embodiment illustrate the present invention but are not intended to limit the present invention, and those skilled in the art may design alternative embodiments without departing from the scope of the appended claims. In claims, any reference signs placed in parentheses should not be construed as limiting the claims. The word "comprising" does not exclude the presence of elements or steps not listed in a claim. The word "a" or "an" preceding an element does not exclude the presence of a plurality of such elements. The present invention may be implemented by virtue of hardware including several different elements and by virtue of a properly-programmed computer. In the apparatus claims enumerating several units, several of these units can be embodied by one and the same item of hardware. The usage of the words first, second and third, et cetera, does not indicate any ordering. These words are to be interpreted as names.

In addition, it should be noted that the language used in the specification has been principally selected for readability and instructional purposes, and may not have been selected to delineate or circumscribe the inventive subject matter. Therefore, those having ordinary skill in the art appreciate that many modifications and variations without departing from the scope and spirit of the appended claims are obvious. The disclosure of the present invention is intended to be illustrative, but not limiting, of the scope of the invention, which is set forth in the claims.

What is claimed is:

1. A method for implementing network access, comprising: determining, by a server, whether a webpage that a terminal requests to access is a malicious webpage in the case that the terminal requests to access the webpage; when yes, determining, by the server, content of the webpage that the terminal requests to access, wherein the content of the webpage is displayed in a browsing area of a browser; and searching for, by the server, a webpage with relevant content matching the content of the webpage that the terminal requests to access, as a reference webpage, and providing information of the found reference webpage to the terminal wherein the server searching for the webpage with relevant content matching the content of the webpage that the terminal requests to access, as the reference webpage comprises: the server searches whether the webpage that matches the main content of the webpage that the terminal requests to access exists in a buffer database, and, when the webpage exists in the buffer database, the server considers the found webpage as the reference webpage and provides information of the reference webpage to the terminal, when the webpage does not exist in the buffer database, the server searches for, in a webpage information database, a webpage that matches the main content of the webpage that the terminal requests to access, considers the found webpage as the reference webpage, and provides information of the reference webpage to the terminal and stores the reference webpage in the buffer database.

2. The method for implementing network access according to claim 1, wherein the server determines whether it is needed to provide the webpage with relevant content to the terminal in the case that the terminal requests to access the webpage, and the server determines the content of the webpage that the terminal requests to access when the result is yes.

3. The method for implementing network access according to claim 2, wherein the server provides the terminal with information of reference webpages matching the content of the webpage that the terminal requests to access/or selects one of the reference webpages and provides information of this reference webpage to the terminal.

4. The method for implementing network access according to claim 1, wherein the determining, by the server, whether the webpage that the terminal requests to access is the malicious webpage comprises: the server queries in a malicious web address library in the case that the terminal requests to access the webpage; when the query result shows that the webpage that the terminal requests to access exists in the malicious web address library, the server determines that the webpage that the terminal requests to access is a malicious webpage, and provides the terminal with information of the found reference webpage matching the content of the webpage that the terminal requests to access, and a prompt that the webpage that the terminal requests to access is a malicious webpage.

5. The method for implementing network access according to claim 3, wherein in the case that the terminal requests to access is the malicious webpage, the method further comprises: prohibiting, by the server, the terminal from accessing the malicious webpage.

6. The method for implementing network access according to claim 1, wherein before the server provides information of the reference webpage found from the webpage information database to the terminal, the method further comprises: the server determines whether the reference webpage exists in the malicious web address library, and provides information of the reference webpage that does not exist in the malicious web address library to the terminal.

7. The method for implementing network access according to claim 1, wherein before the server provides information of the found reference webpage to the terminal, the method further comprises: the server determines the type of the terminal and determines whether to perform transcoding for the reference webpage according to the type of the terminal; transcoding is performed for the reference webpage when the result shows that the transcoding is needed, and the server provides the reference webpage after transcoding to the terminal.

8. The method for implementing network access according to claim 1, wherein providing information of the found reference webpage to the terminal comprises: directly providing the found reference webpage to the terminal, and/or providing the matching information of the found reference webpage and the webpage to be accessed to the terminal, and/or providing a link address of the found reference webpage to the terminal, and/or providing a title of the found webpage to the terminal.

9. The method for implementing network access according to claim 1, wherein webpage content includes one of news, pictures, novel, video, music, games and shopping information in the webpage or combinations of more of them, or content relevant to them.

10. A device for implementing network access, comprising: a memory having instructions stored thereon; a processor to execute the instructions to perform operations for implementing network access, comprising: determining whether a webpage that a terminal requests to access is a malicious webpage in the case that the terminal requests to access the webpage; when yes, determining content of the webpage that the terminal requests to access in the case that the terminal requests to access the webpage, wherein the content of the webpage is displayed in a browsing area of a browser; searching for a webpage with relevant content matching the content of the webpage that the terminal requests to access, as a reference webpage; and providing information of the found reference webpage to the terminal wherein the server searching for the webpage with relevant content matching the content of the webpage that the terminal requests to access, as the reference webpage comprises: the server searches whether the webpage that matches the main content of the webpage that the terminal requests to access exists in the buffer database, and, when the webpage exists in a buffer database, the server considers the found webpage as the reference webpage and provides information of the reference webpage to the terminal, when the webpage does not exist in the buffer database, the server searches for, in a webpage information database, a webpage that matches the main content of the webpage that the terminal requests to access, considers the found webpage as the reference webpage, and provides information of the reference webpage to the terminal and stores the reference webpage in the buffer database.

11. The device for implementing network access according to claim 10, wherein the operations further comprise: determining whether it is needed to provide the webpage with relevant content to the terminal in the case that the terminal requests to access the webpage, and determining the content of the webpage that the terminal requests to access when the result is yes.

12. The device for implementing network access according to claim 11, wherein providing the terminal with information of reference webpages matching the content of the webpage that the terminal requests to access/or selecting one of the reference webpages and providing information of this reference webpage to the terminal.

13. The device for implementing network access according to claim 10, wherein the determining whether the webpage that the terminal requests to access is the malicious webpage comprises: querying in a malicious web address library in the case that the terminal requests to access the webpage; when the query result shows that the webpage that the terminal requests to access exists in the malicious web address library, determining that the webpage that the terminal requests to access is a malicious webpage, and providing the terminal with information of the found reference webpage matching the content of the webpage that the terminal requests to access, and a prompt that the webpage that the terminal requests to access is a malicious webpage.

14. The device for implementing network access according to claim 13, wherein the operations further comprise: in the case that the terminal requests to access is the malicious webpage, prohibiting the terminal from accessing the malicious webpage in the case that the webpage that terminal requests to access is a malicious webpage.

15. The device for implementing network access according to claim 10, wherein before the providing information of the found reference webpage to the terminal, the operations further comprise: determining the type of the terminal and determining whether to perform transcoding for the reference webpage according to the type of the terminal; performing transcoding for the reference webpage when the result shows that the transcoding is needed; and providing the reference webpage after transcoding to the terminal.

16. The device for implementing network access according to claim 10, wherein the providing information of the found reference webpage to the terminal comprises: directly providing the found reference webpage to the terminal, and/or providing the matching information of the found reference webpage and the webpage to be accessed to the terminal, and/or providing a link address of the found reference webpage to the terminal, and/or providing a title of the found webpage to the terminal.

17. A system for implementing network access, comprising: a terminal, a server, a buffer database, and a webpage information database; wherein the server comprises: a memory having instructions stored thereon; a processor to execute the instructions to perform operations for implementing network access, comprising: determining whether a webpage that a terminal requests to access is a malicious webpage in the case that the terminal requests to access the webpage; when yes, determining content of the webpage that the terminal requests to access in the case that the terminal requests to access the webpage, wherein the content of the webpage is displayed in a browsing area of a browser; searching for a webpage with relevant content matching the content of the webpage that the terminal requests to access, as a reference webpage; providing information of the found reference webpage to the terminal wherein the server searching for the webpage with relevant content matching the content of the webpage that the terminal requests to access, as the reference webpage comprises: the server searches whether the webpage that matches the main content of the webpage that the terminal requests to access exists in the buffer database, and, when the webpage exists in the buffer database, the server considers the found webpage as the reference webpage and provides information of the reference webpage to the terminal, when the webpage does not exist in the buffer database, the server searches for, in the webpage information database, a webpage that matches the main content of the webpage that the terminal requests to access, considers the found webpage as the reference webpage, and provides information of the reference webpage to the terminal and stores the reference webpage in the buffer database; the buffer database buffers information of the webpage; the webpage information database stores information of the webpage; and preferentially searching for, in the webpage information buffered by the buffer database, a reference webpage which matches the content of the webpage that the terminal requests to access.

18. The system for implementing network access according to claim 17, wherein the system further comprises: a malicious web address library to store information relevant to one or more kinds of suspicious web address, suspicious code, malicious web address and malicious code; the determining whether a webpage that a terminal requests to access is a malicious webpage comprises: querying in the malicious web address library in the case that the terminal requests to access the webpage; when the query result shows that the webpage that the terminal requests to access exists in the malicious web address library, determining that the webpage that the terminal requests to access is a malicious webpage, and providing the terminal with information of the found reference webpage matching the content of the webpage that the terminal requests to access, and a prompt that the webpage that the terminal requests to access is a malicious webpage.

* * * * *